（12）United States Patent
Decoux

(10) Patent No.: US 9,189,673 B2
(45) Date of Patent: Nov. 17, 2015

(54) IDENTIFIER AND METHOD OF ENCODING INFORMATION

(71) Applicant: SICPA Holding SA, Prilly (CH)

(72) Inventor: Eric Decoux, Vevey (CH)

(73) Assignee: SICPA HOLDING SA, Prilly (CH)

( * ) Notice: Subject to any disclaimer, the term of this patent is extended or adjusted under 35 U.S.C. 154(b) by 113 days.

(21) Appl. No.: 14/016,989

(22) Filed: Sep. 3, 2013

(65) Prior Publication Data

US 2014/0064619 A1 Mar. 6, 2014

Related U.S. Application Data

(60) Provisional application No. 61/702,475, filed on Sep. 18, 2012.

(30) Foreign Application Priority Data

Sep. 3, 2012 (EP) .................................... 12006224

(51) Int. Cl.
*G06K 9/18* (2006.01)
*G06K 7/14* (2006.01)
*G06K 19/06* (2006.01)
*G06K 19/14* (2006.01)

(52) U.S. Cl.
CPC ........ *G06K 7/1417* (2013.01); *G06K 19/06037* (2013.01); *G06K 19/06056* (2013.01); *G06K 19/14* (2013.01)

(58) Field of Classification Search
USPC ........ 382/181, 182, 183; 235/462.01, 462.08, 235/494
See application file for complete search history.

(56) References Cited

U.S. PATENT DOCUMENTS

| | | | |
|---|---|---|---|
| 6,688,522 B1 * | 2/2004 | Philyaw et al. | 235/462.01 |
| 6,778,683 B1 | 8/2004 | Bonner et al. | |
| 2004/0090642 A1 * | 5/2004 | Hikita | 358/1.11 |
| 2004/0211844 A1 * | 10/2004 | Marshall | 235/494 |
| 2006/0022059 A1 * | 2/2006 | Juds | 235/494 |
| 2010/0012736 A1 * | 1/2010 | Wilds et al. | 235/494 |
| 2012/0106787 A1 | 5/2012 | Nechiporenko et al. | |

OTHER PUBLICATIONS

European Search Report issued on Mar. 20, 2013, in European Application No. 12006224.5-1806.

* cited by examiner

*Primary Examiner* — John Strege
(74) *Attorney, Agent, or Firm* — Oblon, McClelland, Maier & Neustadt, L.L.P.

(57) ABSTRACT

A two-dimensional code that includes a bar code readable by a scanning operation is provided. The two-dimensional code has an associated alphanumeric representation, and the bar code and the alphanumeric representation represent the same first information. Further, a position of at least one character of the alphanumeric representation with respect to at least one element of the bar code represents second information.

15 Claims, 6 Drawing Sheets

IDENTIFIER AND METHOD OF ENCODING INFORMATION

CROSS-REFERENCE TO RELATED APPLICATIONS

The present application is based on and claims the benefit of priority to U.S. Application Ser. No. 61/702,475, filed Sep. 18, 2012, and European Patent Application No. 12006224.5 filed Sep. 3, 2012. The entire contents of the above-identified applications are incorporated herein by reference.

FIELD

The present disclosure relates to two-dimensional codes, in particular to two-dimensional codes in the form of a bar code, and to a method of encoding information in a bar code.

DESCRIPTION OF THE RELATED ART

A vast majority of consumer goods, or at least their packages, comprise two-dimensional codes, in particular in the form of bar codes. A bar code is an optical machine-readable representation of data, which shows data about the object on which it is provided. Originally, bar codes represented data by varying the widths and spacings of parallel lines, and may be referred to as linear or one-dimensional. Later, they evolved into rectangle, dots, hexagons and other geometric patterns in two dimensions. Although two-dimensional systems use a variety of symbols, they are generally referred to as bar codes as well. Bar codes were initially scanned using special optical scanners called bar code readers; later, scanners and interpretive software became available on devices including desktop printers and smartphones. An example of a type of bar code is the Universal Product Code (UPC).

Many goods are vulnerable to counterfeiting and/or tampering, for instance luxury goods, but also usual consumer goods. Counterfeiting and/or tampering may lead to the identifiers provided on the counterfeited and/or tampered goods also being counterfeited and/or tampered. Anti-counterfeiting solutions that have been used for protection of consumer goods from counterfeiting are often based on marking the item with a specific material, code, or marking. However, most of these solutions are visible or at least easily recognizable by canny counterfeiters. Until now, it has proven difficult to devise efficient anti-counterfeiting solutions that are not immediately recognizable by counterfeiters.

Therefore, there is a need for an improved two-dimensional code and a method of encoding information in a bar code that provides the authentication functionality, while remaining invisible or difficult to recognize.

SUMMARY

It is an object to provide a two-dimensional code and a method of encoding information that allow for authenticating a bar code. This object is solved by the subject matter of the independent claims. Preferred embodiments are the subject matter of the dependent claims.

One embodiment provides a two-dimensional code, comprising: (1) a bar code readable by a scanning operation; and (2) an associated alphanumeric representation, the bar code and the alphanumeric representation representing a same first information, wherein a position of at least one character of the alphanumeric representation with respect to at least one element of the bar code represents second information.

In another embodiment, the position of the at least one character of the alphanumeric representation with respect to the at least one element of the bar code is a horizontal position along an axis substantially perpendicular to parallel lines forming the bar code.

In another embodiment, the horizontal position of the at least one character of the alphanumeric representation is offset by a distance with respect to a reference horizontal position of the at least one character of the alphanumeric representation.

In another embodiment, the distance is based on an output resolution of a device for outputting image data of the bar code and the associated alphanumeric representation of the bar code.

In another embodiment, the distance is between 10 µm and 150 µm, preferably between 10 µm and 100 µm.

Another embodiment provides a method of encoding information into a two-dimensional code, comprising: generating the two-dimensional code including a bar code and an associated alphanumeric representation, the bar code and the alphanumeric representation representing a same first information, wherein the generating step includes encoding second information using a position of at least one character of the alphanumeric representation with respect to at least one element of the bar code, wherein that the alphanumeric representation is generated so that the position of the at least one character of the alphanumeric representation with respect to the at least one element of the bar code represents the encoded second information.

In another embodiment, the encoded second information is information on a horizontal position of said at least one character of the alphanumeric representation with respect to said at least one element of the bar code along an axis that is essentially perpendicular to parallel lines forming said bar code.

In another embodiment, the encoded second information is information on a distance by which the horizontal position of said at least one character of the alphanumeric representation is offset with respect to a reference horizontal position of said at least one character of the alphanumeric representation.

In another embodiment, the method further comprises generating image data of the two-dimensional code and outputting the image data.

In another embodiment, the outputting step comprises at least one of printing the generated image data onto a label and displaying the generated image data on a display screen.

Another embodiment provides a method of decoding information in a two-dimensional code that includes a bar code and an associated alphanumeric representation, the method comprising: reading the bar code and the associated alphanumeric representation using a bar code reading device, the bar code and the alphanumeric representation representing a same first information; and detecting second information by detecting a position of at least one character of the alphanumeric representation with respect to at least one element of the bar code.

In a preferred embodiment, the method further comprises the steps of deriving a code from the detected second information; comparing the derived code with a reference code for the bar code; and deriving information on an authenticity of the two-dimensional code based on the result of the comparing step.

Another embodiment provides a non-transitory computer-readable medium storing instructions, which when executed by a processor, cause the processor to execute the following steps: generating the two-dimensional code including a bar code and an associated alphanumeric representation, the bar code and the alphanumeric representation representing a same first information, wherein the generating step includes encoding second information using a position of at least one character of the alphanumeric representation with respect to at least one element of the bar code, wherein that the alphanumeric representation is generated so that the position of the at least one character of the alphanumeric representation with respect to the at least one element of the bar code represents the encoded second information.

Another embodiment provides a non-transitory computer-readable medium storing instructions, which when executed by a processor, cause the processor to decode information in a two-dimensional code that includes a bar code and an associated alphanumeric representation, by executing the following steps: (1) reading the bar code and the associated alphanumeric representation using a bar code reading device, the bar code and the alphanumeric representation representing a same first information; and (2) detecting second information by detecting a position of at least one character of the alphanumeric representation with respect to at least one element of the bar code.

Another embodiment provides an article of manufacture comprising the two-dimensional code disclosed herein.

Another embodiment provides an apparatus for encoding information into a two-dimensional code, comprising: a processor configured to generate the two-dimensional code including a bar code and an associated alphanumeric representation, the bar code and the alphanumeric representation representing a same first information, wherein, in generating the two-dimensional code, the processor is configured to encode second information using a position of at least one character of the alphanumeric representation with respect to at least one element of the bar code, wherein that the alphanumeric representation is generated so that the position of the at least one character of the alphanumeric representation with respect to the at least one element of the bar code represents the encoded second information.

Another embodiment provides an apparatus for decoding information in a two-dimensional code that includes a bar code and an associated alphanumeric representation, the apparatus comprising: (1) a bar code reading device configured to read the bar code and the associated alphanumeric representation, the bar code and the alphanumeric representation representing a same first information; and (2) a processor configured to detect second information by detecting a position of at least one character of the alphanumeric representation with respect to at least one element of the bar code.

BRIEF DESCRIPTION OF THE DRAWINGS

For a more complete understanding of the disclosed embodiments, as well as other objects and further features thereof, it is referred to the following detailed description of the embodiments in conjunction with the following exemplary drawings, wherein.

Reference numbers refer to the same or equivalent parts throughout the various figures of the drawings.

DETAILED DESCRIPTION

Figure 1A:
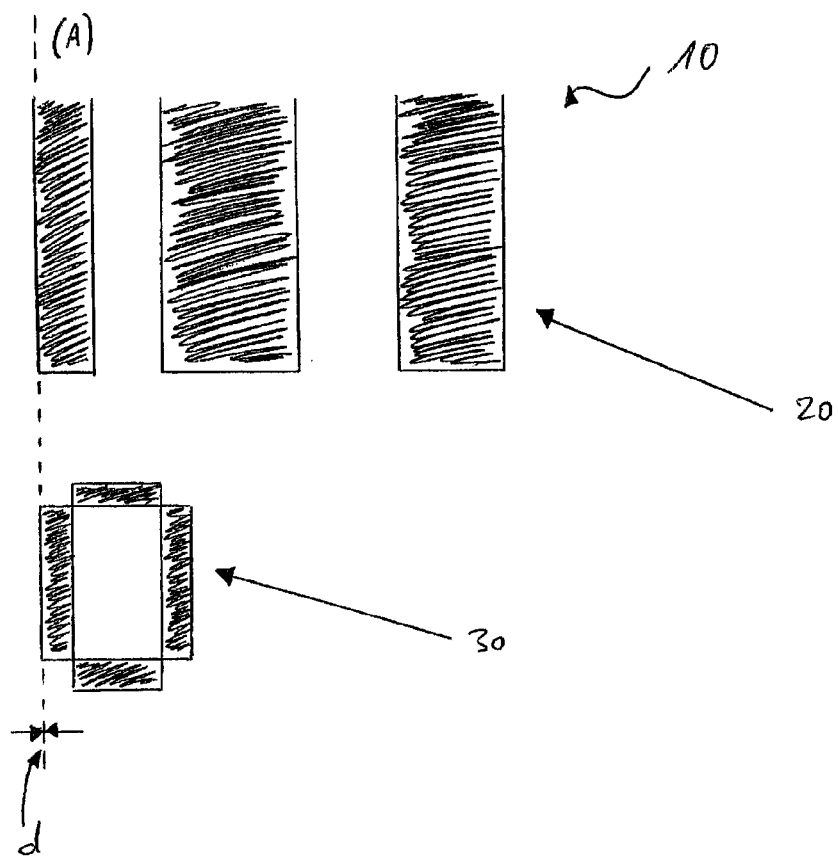
FIG. 1a illustrates a magnified view of a part of an exemplary bar code.

FIG. 1a represents a magnified view of a part of an exemplary bar code according to an aspect of the disclosed embodiments. FIG. 1a illustrates a portion of a bar code 10, showing the ends of three bars 20 and one character 30 of an alphanumeric representation associated with the bar code 10. The bar code 10 represents first information, the bar code 10 being associated with its alphanumeric representation, which represents the same first information. In the present case, the character 30 of the alphanumeric representation that is illustrated in FIG. 1a is the character "0". However, this is only for illustration purposes and those skilled in the art will immediately recognize that the principles, which will be described in the following description, apply to an arbitrary alphanumeric character instead of the character "0". It is apparent from FIG. 1a that the end on the left-hand side of the character 30 of the alphanumeric representation, i.e. in the direction of the run of the alphanumeric representation, is aligned along an axis A (represented in dashed lines) with the end on the left-hand side of the bar located on the far-left hand side of the set of bars 20 of the bar code 10. Hence, a distance d measured along an axis perpendicular to the axis A between the end on the left-hand side of the character 30 of the alphanumeric representation 30 and the end on the left-hand side of the bar located on the far-left hand side of the set of bars 20 of the bar code 10 is equal to 0. This situation corresponds to a standard arrangement of a character of an alphanumeric representation of a bar code with respect to the set of bars of the bar code.

Figure 1B:
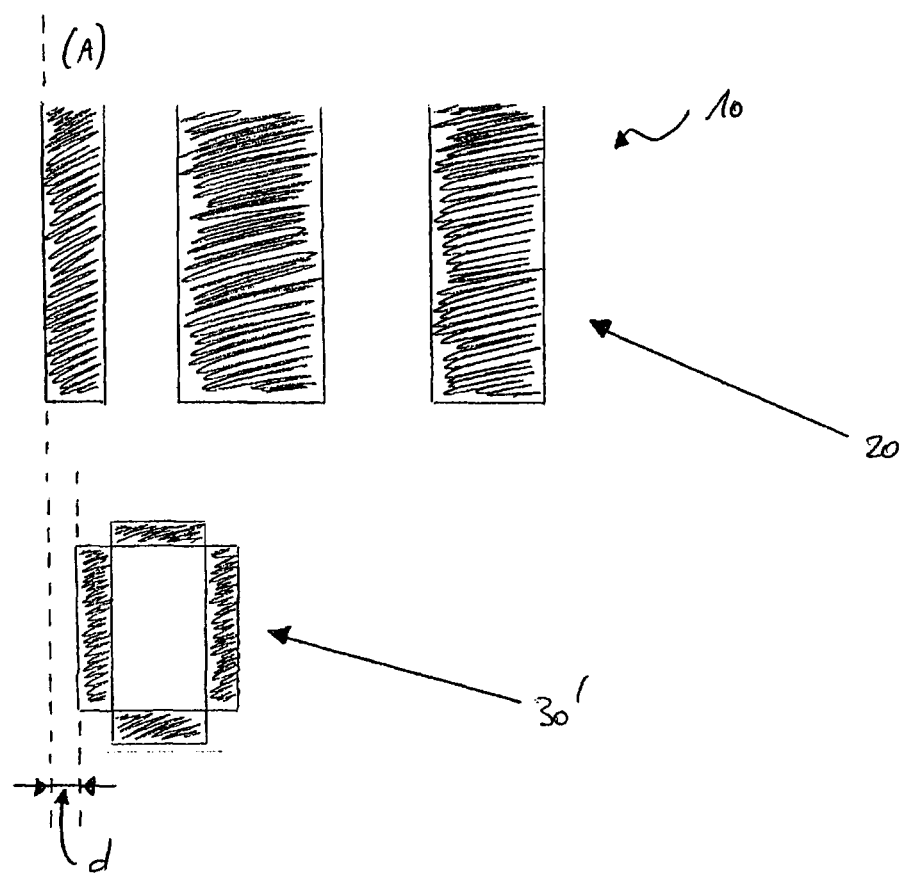
FIG. 1b illustrates a magnified view of a part of an exemplary bar code.

FIG. 1b illustrates a magnified view of a part of an exemplary bar code in accordance with an aspect of the disclosed embodiments. The setup represented in FIG. 1b corresponds to that of FIG. 1a with the exception that the character 30' of the alphanumeric representation is offset by a distance d from the axis A defined by the end on the left-hand side of the bar located on the far-left hand side of the set of bars 20 of the bar code 10. This allows for defining, further to the first information associated with the alphanumeric representation, which is encoded in the set of bars of the bar code 10, second information on a position of the character 30' of the alphanumeric representation with respect to an element of the bar code. This second information may be encoded into an identifier.

In comparison with the situation illustrated in FIG. 1a, the alphanumeric representation of the bar code is therefore modified in such manner that a position of the character 30' of the alphanumeric representation with respect to an element of the bar code represents the second information. This "concealed" modification of the alphanumeric representation of the bar code according to this embodiment provides the advantage that it is not visible with bare eyes and it is therefore not easily recognizable by counterfeiters. Consequently, when trying to counterfeit a bar code of a product, a counterfeiter would only consider the first information of the alphanumeric representation and generate a counterfeited bar code that would only encode this first information. However, since this counterfeited bar code would not have a modified alphanumeric representation with some characters thereof that are offset with respect to a reference position, this counterfeited bar code would not contain the second information. By detecting this modification of the alphanumeric representation, an information on the authenticity of the bar code and, in turn, the product on which the bar code is attached, can be obtained. The advantages associated with the disclosed embodiments will be described in more detail in the following description.

The efficiency of the method of encoding the information in a bar code according to an embodiment as an anti-counterfeiting and/or anti-tampering solution is linked to the output resolution of the device for outputting image data of the bar code. In case of a printer being the output device, the efficiency of the method according to an embodiment as an anti-counterfeiting and/or anti-tampering solution is therefore linked to the printing resolution of the printer. Indeed, the minimum detectable variation of a character of the alphanumeric representation with respect to a reference position is one dot of the printer. In the case of a e.g. a 300 dot-per-inch (dpi) printer, a variation of one dot corresponds to a distance of 25.4/300 mm, i.e. 84.66 micrometers. In the case of a 2400 dpi printer, a variation of one dot corresponds to a distance of 25.4/2400 mm, i.e. 10.58 micrometers. In order not to be visible with bare eyes, the total variation of a character of the modified alphanumeric representation should not exceed a tenth of a millimeter, i.e. 100 micrometers. This means that, for a 300 dpi printer, the only possible offset distance for a character of the alphanumeric representation is only one dot. This therefore leaves only two possibilities for encoding this offset position of the character of the modified alphanumeric representation with respect to the reference element of the bar code, namely either 0 or 1. In the case of a 600 dpi printer, the minimum variation is 25.4/600 mm, i.e. 42.33 micrometers, which leads to the offset possibilities 0, 1 or 2. In the case of a 1200 dpi printer, the minimum variation is 25.4/1200 millimeters, i.e. 21.17 micrometers, which leads to the offset possibilities 0, 1, 2, 3, 4. Finally, for a 2400 dpi printer, the minimum variation is 25.4/2400, millimeters, i.e. 10.58 micrometers, which leads to the offset possibilities 0, 1, 2, 3, 4, 5, 6, 7, 8.

Accordingly, as outlined above, in a preferred embodiment, the position of a character of the alphanumeric representation is offset by a distance with respect to a reference position of a character of the alphanumeric representation. The offset distance is based on an output resolution of the device for outputting image data of the bar code in the alphanumeric representation of the bar code, for instance, a printer. According to a preferred embodiment, the distance is comprised between 10 micrometers and 150 micrometers, preferably between 10 micrometers and 100 micrometers. This allows for efficiently ensuring that the offset characters of the alphanumeric representation cannot be recognized with bare eyes by malicious counterfeiters.

The example representation of FIG. 1b represents a preferred embodiment, wherein the position of a character of the alphanumeric representation with respect to an element of the bar code represents second information, further to the first information that is associated to the alphanumeric representation of the bar code. This position of the character of the alphanumeric representation with respect to an element of the bar code is preferably a horizontal position along an axis that is essentially perpendicular to parallel lines of the bar code. However, those skilled in the art will immediately recognize that, even though a horizontal position of a character of an alphanumeric representation with respect to a reference horizontal position of a character of an alphanumeric representation has been represented in detail in FIG. 1b and represents a preferred embodiment, other possibilities may be foreseen, in particular a vertical position of a character of the alphanumeric representation with respect to a reference element of the barcode. As has been outlined above, one important aspect according to embodiments is that the modification of the alphanumeric representation of the bar code, which encodes second information further to the first information, remains "concealed", i.e. invisible with bare eyes or at least difficult to be recognized by counterfeiters.

Even though FIG. 1b represents the case of only one character, a "0", being offset with respect to an element of the bar code, those skilled in the art will immediately recognize that, since an alphanumeric representation of a bar code comprises a plurality of characters, this teaching may be applied to one character within the alphanumeric representation of the bar code, to a plurality of characters of the alphanumeric representation, or even to all the characters of the alphanumeric representation.

By creating a modified alphanumeric representation, wherein a position of at least one character of the alphanumeric representation of the bar code with respect to at least one element of the bar code represents second information, further to the first information associated to the alphanumeric representation, an identifier may be defined, which can be used as an anti-counterfeiting and/or anti-tampering measure. This second information on the position of at least one character of the alphanumeric representation with respect to at least one element of the bar code is used when generating the alphanumeric representation of the bar code, wherein the alphanumeric representation is generated based on the second information in such a manner that a position of the at least one character of the alphanumeric representation with respect to the at least one element of the bar code represents the encoded second information. By reading the "modified" bar code containing both the first and second information, detecting this second information on the position of the at least one character of the alphanumeric representation with respect to the at least one element of the bar code, it can be determined whether the read bar code is authentic or not, thereby giving an authenticity information on the product, to which the bar code is attached.

According to an embodiment, a code is derived based on the detected second information. For instance, assuming the alphanumeric representation has n characters, one bit may be associated to each character, wherein "0" means that no offset of the specific character has been detected and "1" means that an offset has been detected. A code with n bits is therefore obtained. This n-bit code is then compared with a reference code for the two-dimensional code and information on an authenticity of the two-dimensional code is derived based on the comparison result. Instead of a simple comparison with an expected reference code, a mathematical operation may be performed on the obtained code and then compared with an expected result. As an example, the sum of the m first bits of the n-bit code, m being an integer comprised between 1 and n, modulo 4 may be calculated and compared with an expected result, for instance, whether the sum modulo 4 is equal to the last two bits. Hence, a mathematical rule may be defined and it is then checked whether the code derived from the detected second information on the position of the characters of the alphanumeric representation with respect to the bar code fulfills this mathematical rule. In case the code fulfills the rule, the two-dimensional code is considered as being authentic.

Figure 2:
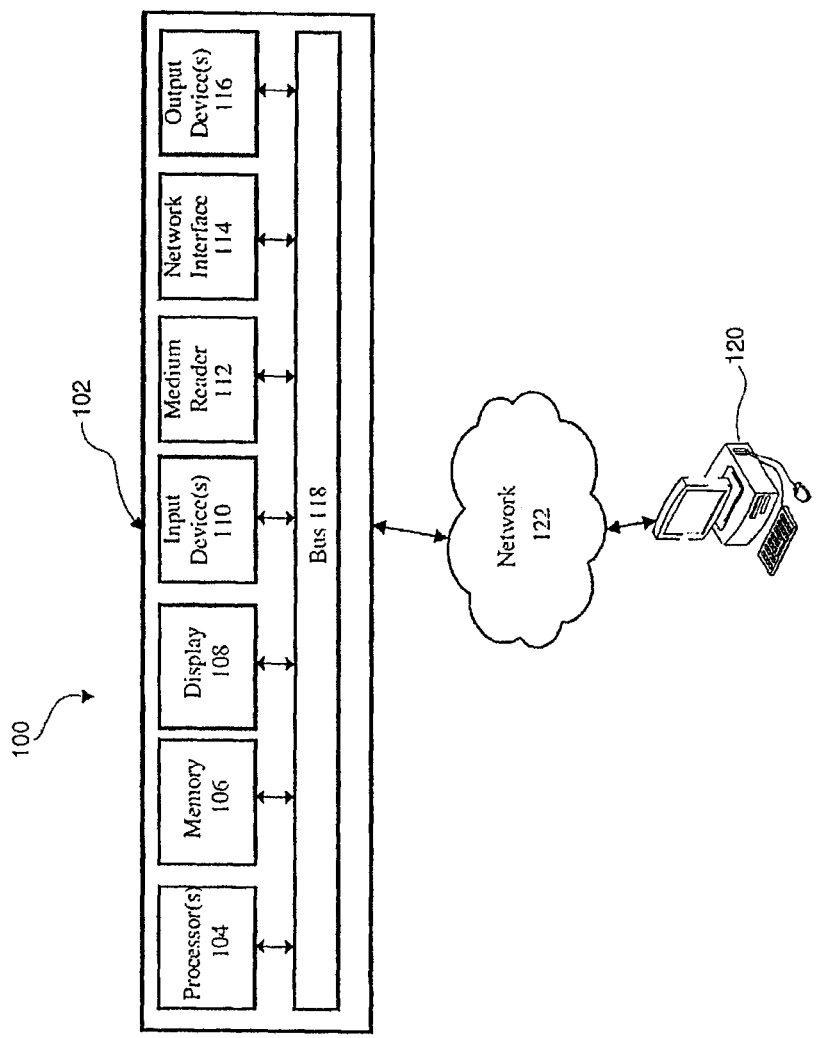
FIG. 2 illustrates an exemplary system for use in accordance with the disclosed embodiments.

FIG. 2 is an exemplary system for use in accordance with the embodiments described herein. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment. The computer system 102 may operate in the capacity of a server in a network environment, or in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, additional embodiments may include any collection of systems or sub-systems that individually or jointly execute instructions or perform functions.

As illustrated in FIG. 2, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 2, the computer system 102 may include a computer display 108, such as a liquid crystal display, an organic light emitting diode, a flat panel display, a solid state display, a cathode ray tube, a plasma display, or any other known display. The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices no. Moreover, those skilled in the art further appreciate that the above-listed, exemplary input devices no are not meant to be exhaustive and that the computer system 102 may include any additional, or alternative, input devices no.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 2, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 2 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive. As will be appreciated by those skilled in the art, the disclosed embodiments may be embodied as a system, a method and a computer program product. Accordingly, the disclosed embodiments may take the form of an entirely hardware embodiment, an entirely software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

Any combination of one or more computer-readable medium(s) may be utilized. The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include at least one of the following: a portable computer diskette, a hard disk, a random access memory (RAM), a read-only memory (ROM), an erasable programmable read-only memory (EPROM or Flash memory), a portable compact disc read-only memory (CDROM), an optical storage device, a transmission media such as those supporting the Internet or an intranet, a magnetic storage device, a Universal Serial Bus (USB) key, and/or a certificate.

In the context of the present application, a computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, some embodiments may be embodied in a field programmable gate array (FPGA).

Figure 3:
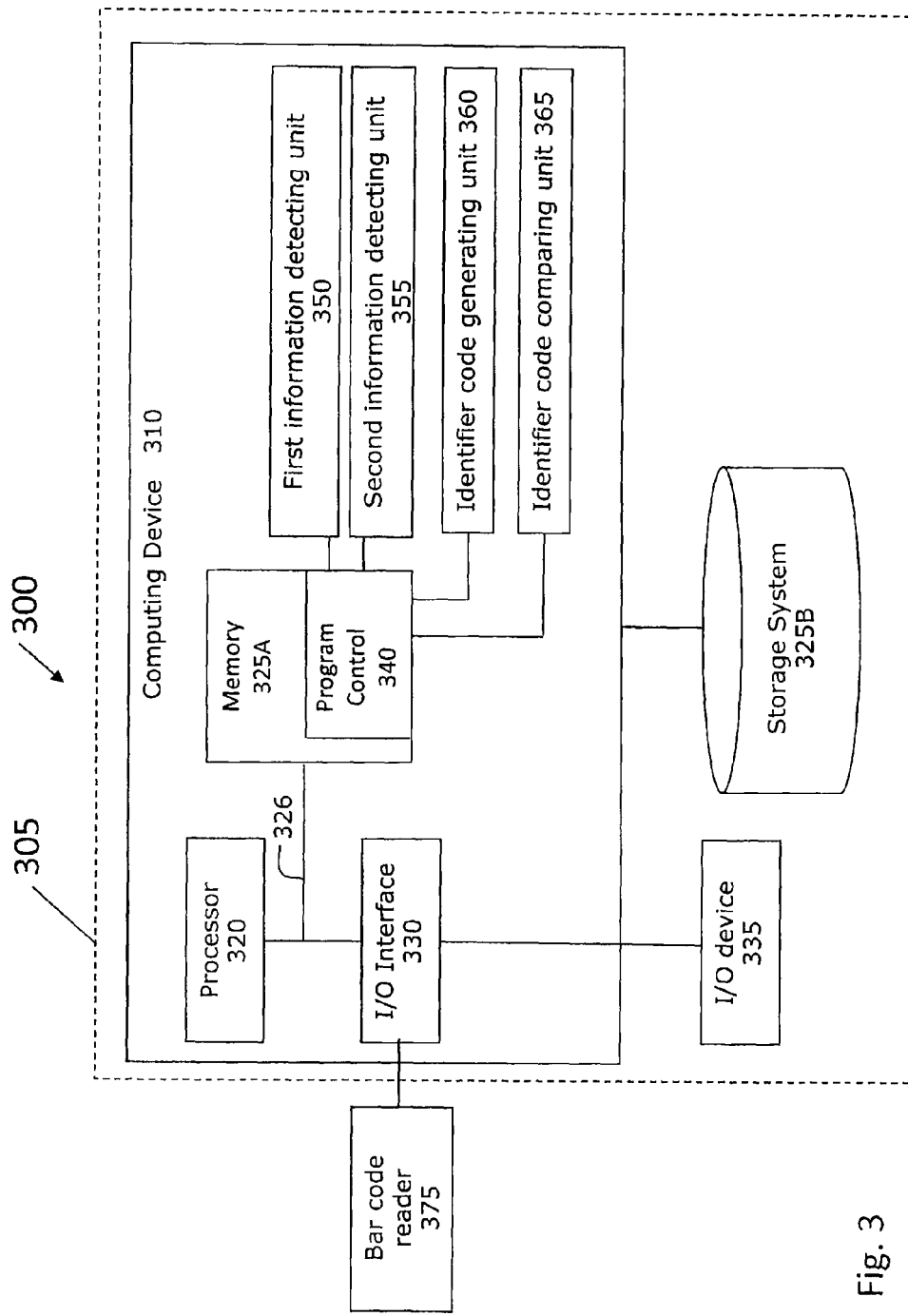
FIG. 3 shows an illustrative environment for carrying out the processes in accordance with the disclosed embodiments.

FIG. 3 shows an exemplary environment 300 for carrying out the processes in accordance with the disclosed embodiments. The illustrated environment 300 includes a computing system 305 that can perform the processes described herein. In particular, the computing system 305 includes a computing device 310 that can be resident on a network infrastructure or computing device of a third party service provider.

According to a disclosed embodiment, the computing device 310 includes a processor 320, memory 325A, an Input/Output (I/O) interface 330, and a bus 326. The memory 325A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 310 is in communication with the external I/O device 335 and the storage system 325B. For example, the I/O device 335 can comprise any device that enables an individual to interact with the computing device 310 or any device that enables the computing device 310 to communicate with one or more other computing devices using any type of communications link. The external I/O device 335 may be, for example, a handheld device, PDA, handset, keyboard, smartphone, etc.

Additionally, in accordance with disclosed embodiments, the environment 300 includes a bar code reader 375 for reading a bar code that is connected to the I/O interface 330. The computing device 310 further comprises a first information detecting unit 350 and a second information detecting unit 355. The first information detecting unit 350 is configured for obtaining a code from a bar code read by the bar code reader 375 of the environment 300. The second information detecting unit 350 is configured for detecting a second information on a position of at least one character of the alphanumeric representation associated with the read bar code with respect to at least one element of the read bar code.

The computing device 310 further comprises an identifier code generating unit 360 and an identifier code comparing unit 365. The identifier code generating unit 360 is configured for deriving an identifier code based on the detected second information on the position of at least one character of the alphanumeric representation with respect to the at least one element of the bar code. The identifier code comparing unit 365 is configured for comparing the derived identifier code with a reference identifier code expected for the two-dimensional code.

In general, the processor 320 executes computer program code (e.g., program control 340), which can be stored in the memory 325A and/or storage system 325B. Moreover, in accordance with aspects of the disclosed embodiments, the program control 340 having program code controls the first information detecting unit 350, the second information detecting unit 355, the identifier code generating unit 360 and the identifier code comparing unit 365. While executing the computer program code, the processor 320 can read and/or write data to/from memory 325A, storage system 325B, and/or I/O interface 330. The program code executes the processes of the disclosed embodiments. The bus 326 provides a communications link between each of the components in the computing device 310. According to one embodiment, the program control 340 is configured for deriving information on an authenticity of the bar code read by the bar code reader 375 based on the second information read by the second information detecting unit 355. According to a further embodiment, information on an authenticity of the read bar code may be obtained from a comparison result output by the identifier code comparing unit 365.

The computing device 310 can comprise any general purpose computing article of manufacture capable of executing computer program code installed thereon (e.g., a personal computer, server, etc.). However, it is understood that the computing device 310 is only representative of various possible equivalent-computing devices that may perform the processes described herein. To this extent, in embodiments, the functionality provided by the computing device 310 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 305 is only illustrative of various types of computer infrastructures for implementing the disclosed embodiments. For example, in embodiments, the computing system 305 comprises two or more computing devices (e.g., a server cluster) that communicate over any type of communications link, such as a network, a shared memory, or the like, to perform the process described herein. Further, while performing the processes described herein, one or more computing devices on the computing system 305 can communicate with one or more other computing devices external to the computing system 305 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 4:
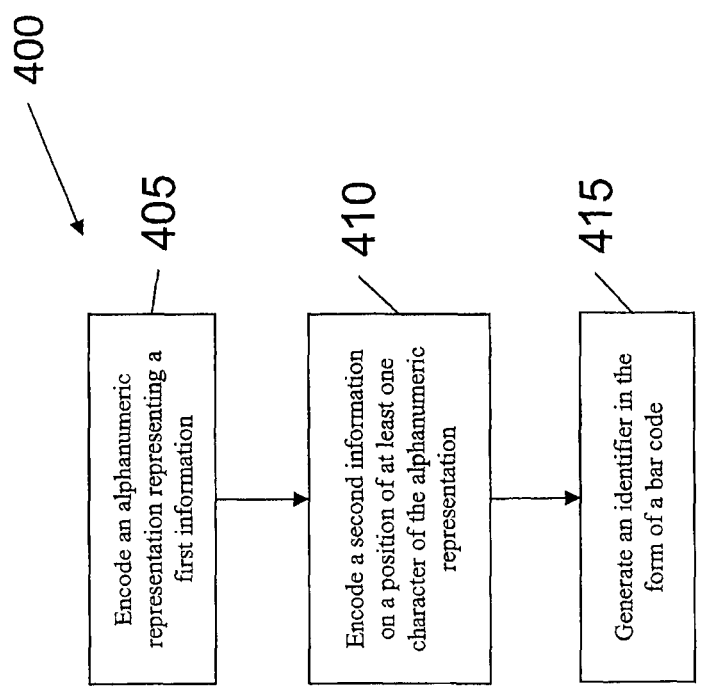
FIGS. 4 and 5 show exemplary flow diagrams for performing aspects of the disclosed embodiments.
Figure 5:
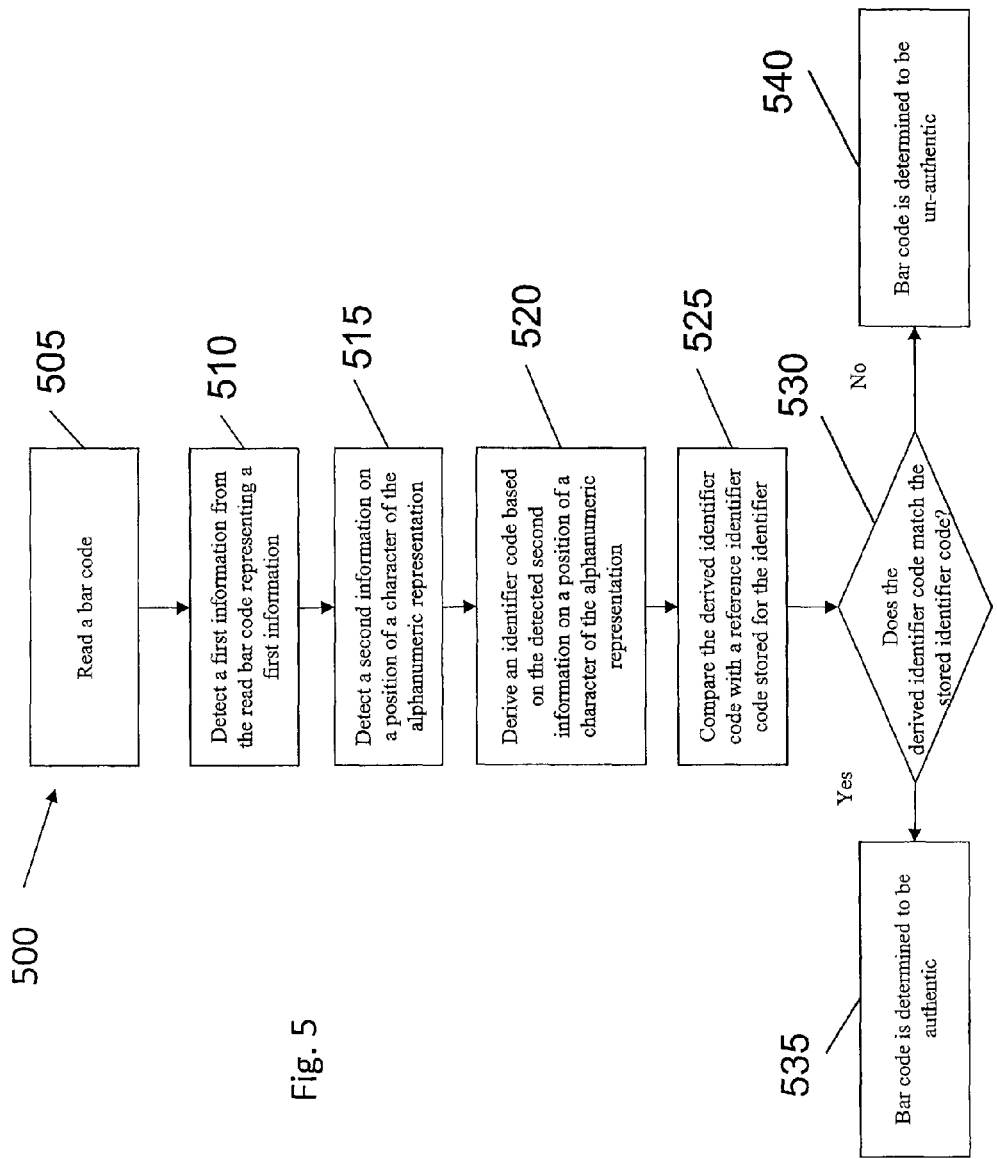

FIGS. 4 and 5 show exemplary flow diagrams for performing aspects of the disclosed embodiments. The steps of FIGS. 4 and 5 may be implemented in the environment of FIG. 3, for example. The flowcharts and/or block diagrams in FIGS. 4 and 5 illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of each flowchart and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

FIG. 4 illustrates an exemplary flow 400 for encoding information in a bar code according to one embodiment. At step 405, an alphanumeric representation that represents first information is encoded. At step 410, a second information on a position of at least one character of the alphanumeric representation with respect to at least one element of the bar code is encoded. At step 415, a two-dimensional code in the form of a bar code, which represents the same first information as the encoded alphanumeric representation as a set of bars, is generated. The alphanumeric representation of the bar code, which is generated at step 415, is generated based on the second information encoded at step 410 in such a manner that a position of the at least one character of the alphanumeric representation with respect to the at least one element of the bar code represents the encoded second information.

FIG. 5 illustrates an exemplary flow 500 for decoding information in a two-dimensional code in the form of a bar code according to one embodiment. At step 505, a two-dimensional code in the form of a bar code is read using e.g. the bar code reader 375 of the environment 300 shown in FIG. 3. At step 510, first information is detected from the read bar code. At step 515, a second information on a position of at least one character of the alphanumeric representation with respect to at least one element of the bar code is detected. At step 520, an identifier code is derived based on the detected second information on the position of the at least one character of the alphanumeric representation with respect to the at least one element of the bar code. At step 525, the derived identifier code is compared with a reference identifier code stored for the two-dimensional code that has been read. At step 530, it is determined whether the derived identifier code matches the stored reference identifier code. If the derived identifier code matches the stored reference identifier code, then the process proceeds to step 535, where the two-dimensional code in the form of a bar code is determined to be authentic. In case the derived identifier code does not match the stored reference identifier code, then the process proceeds to step 540, where the two-dimensional code in the form of a bar code is determined to be un-authentic. Alternatively, as already described above, the simple comparing process can be replaced by a mathematical rule that needs to be fulfilled by the identifier code, in order for the two-dimensional code to be considered authentic.

According to another embodiment, at least one of the following items may comprise a two-dimensional code, even though the list is not exhaustive: a label, a cartridge, a container or capsule that contains foodstuffs, beverages, nutraceuticals or pharmaceuticals, a banknote, a credit card, a thread, a stamp, a tax label, an anti-tamper seal, a security document, a passport, an identity card, a driver's license, an access card, a transportation ticket, an event ticket, a voucher, an ink-transfer film, a reflective film, an aluminum foil, and a commercial good, a capsule, a cork, a lottery ticket, and a packaging such as cigarette or pharmaceutical packaging.

While the disclosed embodiments have been described with reference to specific embodiments, those skilled in the art will understand that various changes may be made and equivalents may be substituted for elements thereof without departing from the true spirit and scope of the disclosed embodiments. In addition, modifications may be made without departing from the essential teachings.

The invention claimed is:

1. A two-dimensional code, comprising:
   a bar code readable by a scanning operation; and
   an associated alphanumeric representation, the bar code and the alphanumeric representation representing a same first information,
   wherein a position of at least one character of the alphanumeric representation with respect to at least one element of the bar code represents second information;
   the position of the at least one character of the alphanumeric representation with respect to the at least one element of the bar code is a horizontal position along an axis that is substantially perpendicular to parallel lines forming the bar code;
   the horizontal position of the at least one character of the alphanumeric representation is offset by a predetermined distance with respect to a reference horizontal position of the at least one character of the alphanumeric representation; and
   the predetermined distance is based on an output resolution of a device for outputting image data of the bar code and the associated alphanumeric representation of the bar code.

2. The two-dimensional code of claim 1, wherein the predetermined distance is between 10 μm and 150 μm, preferably between 10 μm and 100 μm.

3. A method of encoding information into a two-dimensional code, comprising:
   generating the two-dimensional code including a bar code and an associated alphanumeric representation, the bar code and the alphanumeric representation representing a same first information,
   wherein the generating step includes encoding second information using a position of at least one character of the alphanumeric representation with respect to at least one element of the bar code, wherein that the alphanumeric representation is generated so that the position of the at least one character of the alphanumeric representation with respect to the at least one element of the bar code represents the encoded second information;
   the position of the at least one character of the alphanumeric representation with respect to the at least one element of the bar code is a horizontal position along an axis that is substantially perpendicular to parallel lines forming the bar code;
   the horizontal position of the at least one character of the alphanumeric representation is offset by a predetermined distance with respect to a reference horizontal position of the at least one character of the alphanumeric representation; and
   the predetermined distance is based on an output resolution of a device for outputting image data of the bar code and the associated alphanumeric representation of the bar code.

4. The method of claim 3, further comprising:
   generating image data of the two-dimensional code; and
   outputting the image data.

5. The method of claim 4, wherein the outputting step comprises at least one of printing the generated image data onto a label and displaying the generated image data on a display screen.

6. A method of decoding information in a two-dimensional code that includes a bar code and an associated alphanumeric representation, the method comprising:
   reading the bar code and the associated alphanumeric representation using a bar code reading device, the bar code and the alphanumeric representation representing a same first information; and detecting second information by detecting a position of at least one character of the alphanumeric representation with respect to at least one element of the bar code, wherein the position of the at least one character of the alphanumeric representation with respect to the at least one element of the bar code is a horizontal position along an axis that is substantially perpendicular to parallel lines forming the bar code;

the horizontal position of the at least one character of the alphanumeric representation is offset by a predetermined distance with respect to a reference horizontal position of the at least one character of the alphanumeric representation; and the predetermined distance is based on an output resolution of a device for outputting image data of the bar code and the associated alphanumeric representation of the bar code.

7. The method of claim 6, further comprising:

deriving a code from the detected second information;

comparing the derived code with a reference code for the bar code; and deriving information on an authenticity of the two-dimensional code based on the result of the comparing step.

8. A non-transitory computer-readable medium storing instructions, which when executed by a processor, cause the processor to execute the following steps:

generating the two-dimensional code including a bar code and an associated alphanumeric representation, the bar code and the alphanumeric representation representing a same first information, wherein the generating step includes encoding second information using a position of at least one character of the alphanumeric representation with respect to at least one element of the barcode, wherein that the alphanumeric representation is generated so that the position of the at least one character of the alphanumeric representation with respect to the at least one element of the bar code represents the encoded second information;

the position of the at least one character of the alphanumeric representation with respect to the at least one element of the bar code is a horizontal position along an axis that is substantially perpendicular to parallel lines forming the bar code;

the horizontal position of the at least one character of the alphanumeric representation is offset by a predetermined distance with respect to a reference horizontal position of the at least one character of the alphanumeric representation; and the predetermined distance is based on an output resolution of a device for outputting image data of the bar code and the associated alphanumeric representation of the bar code.

9. A non-transitory computer-readable medium storing instructions, which when executed by a processor, cause the processor to decode information in a two-dimensional code that includes a bar code and an associated alphanumeric representation, by executing the following steps:

reading the bar code and the associated alphanumeric representation using a bar code reading device, the bar code and the alphanumeric representation representing a same first information; and detecting second information by detecting a position of at least one character of the alphanumeric representation with respect to at least one element of the bar code, wherein the position of the at least one character of the alphanumeric representation with respect to the at least one element of the bar code is a horizontal position along an axis that is substantially perpendicular to parallel lines forming the bar code;

the horizontal position of the at least one character of the alphanumeric representation is offset by a predetermined distance with respect to a reference horizontal position of the at least one character of the alphanumeric representation; and the predetermined distance is based on an output resolution of a device for outputting image data of the bar code and the associated alphanumeric representation of the bar code.

10. An apparatus for encoding information into a two-dimensional code, comprising:

a processor configured to generate the two-dimensional code including a bar code and an associated alphanumeric representation, the bar code and the alphanumeric representation representing a same first information, wherein, in generating the two-dimensional code, the processor is configured to encode second information using a position of at least one character of the alphanumeric representation with respect to at least one element of the bar code, wherein that the alphanumeric representation is generated so that the position of the at least one character of the alphanumeric representation with respect to the at least one element of the bar code represents the encoded second information;

the position of the at least one character of the alphanumeric representation with respect to the at least one element of the bar code is a horizontal position along an axis that is substantially perpendicular to parallel lines forming the bar code;

the horizontal position of the at least one character of the alphanumeric representation is offset by a predetermined distance with respect to a reference horizontal position of the at least one character of the alphanumeric representation; and the predetermined distance is based on an output resolution of a device for outputting image data of the bar code and the associated alphanumeric representation of the bar code.

11. The apparatus of claim 10, wherein the processor is further configured to:

generate image data of the two-dimensional code; and output the image data.

12. The apparatus of claim 11, further comprising:

means for printing the generated image data onto a label.

13. The apparatus of claim 11, further comprising:

means for displaying the generated image data on a display screen.

14. An article of manufacture comprising the two-dimensional code of claim 1.

15. An apparatus for decoding information in a two-dimensional code that includes a bar code and an associated alphanumeric representation, the apparatus comprising:

a bar code reading device configured to read the bar code and the associated alphanumeric representation, the bar code and the alphanumeric representation representing a same first information; and a processor configured to detect second information by detecting a position of at least one character of the alphanumeric representation with respect to at least one element of the bar code, wherein the position of the at least one character of the alphanumeric representation with respect to the at least one element of the bar code is a horizontal position along an axis that is substantially perpendicular to parallel lines forming the bar code;

the horizontal position of the at least one character of the alphanumeric representation is offset by a predetermined distance with respect to a reference horizontal position of the at least one character of the alphanumeric representation; and the predetermined distance is based on an output resolution of a device for outputting image data of the bar code and the associated alphanumeric representation of the bar code.

* * * * *